April 30, 1968  H. M. WENGER  3,380,477
HYDRAULIC CONTROL REVERSING VALVE
Filed March 11, 1965  2 Sheets-Sheet 1
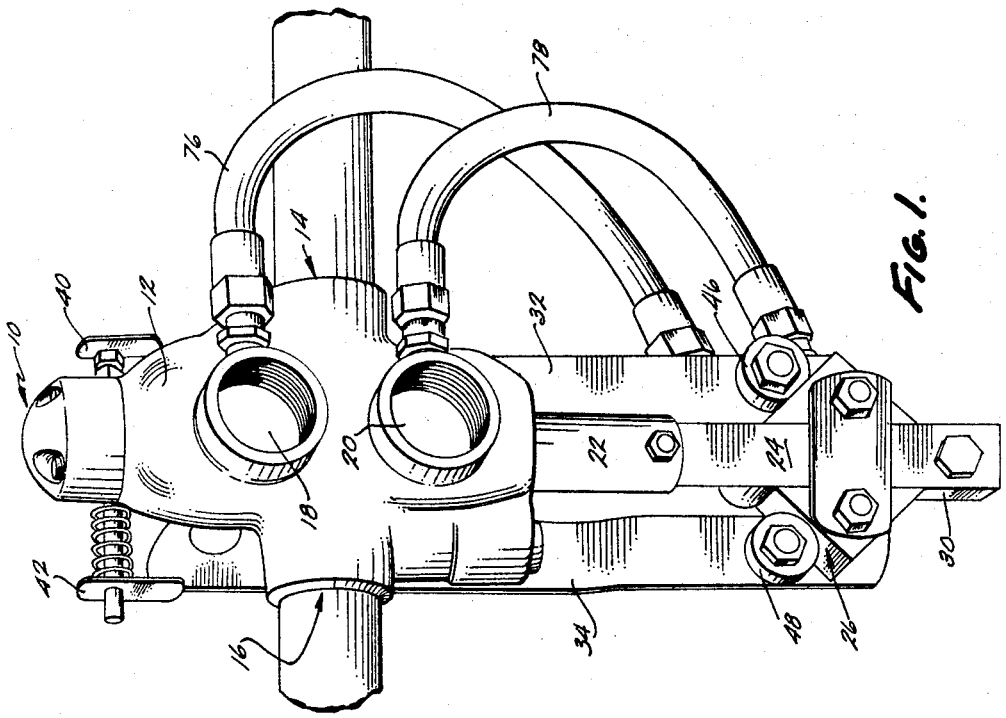
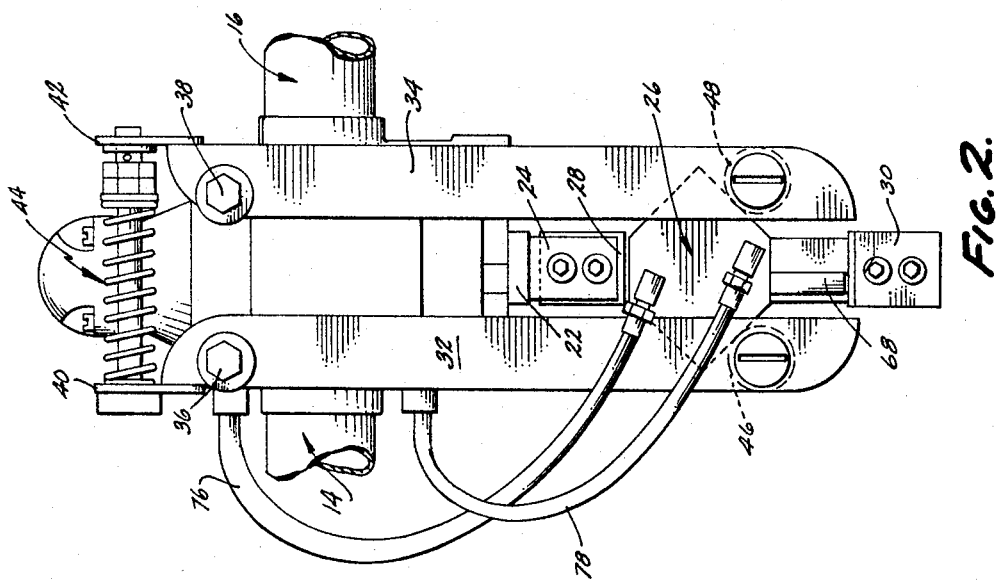
INVENTOR.
HARVEY M. WENGER
BY
ATTORNEYS April 30, 1968  H. M. WENGER  3,380,477
HYDRAULIC CONTROL REVERSING VALVE
Filed March 11, 1965  2 Sheets-Sheet 2
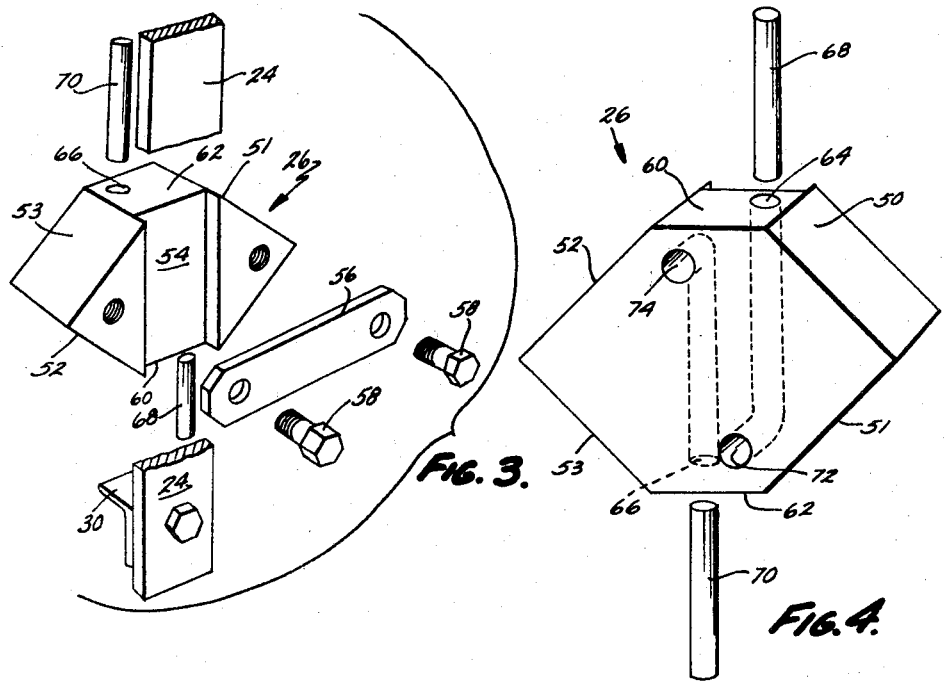
INVENTOR.
HARVEY M. WENGER
BY
ATTORNEYS

United States Patent Office 3,380,477
Patented Apr. 30, 1968

3,380,477
HYDRAULIC CONTROL REVERSING VALVE
Harvey M. Wenger, Holland, Mich., assignor to Big Dutchman, Inc., Zeeland, Mich., a corporation of Michigan
Filed Mar. 11, 1965, Ser. No. 439,039
6 Claims. (Cl. 137—624.14)

ABSTRACT OF THE DISCLOSURE

A valve body with an internal valve member which is movable to control the flow of hydraulic fluid through the valve body, into and out of various preselected ports in the body. A linkage is connected to the internal valve member and extends outwardly through the valve body, and an actuating cam member is slidably attached to this linkage outside the valve body for movements toward and away from the latter between a pair of spaced stops attached to the linkage. The cam member has a pair of hydraulically actuated piston members which are extendable therefrom in response to hydraulic pressure coupled from the valve body to bear against one or the other of the aforesaid stops to thereby move the cam member toward the opposite stop. The cam member also has external lobes formed thereon against which a spring-loaded cam follower mechanism acts to exert a force which first opposes the movement of the cam member occurring in response to one or the other of the aforesaid pistons, and which at a given point on the cam lobe suddenly augments the force applied to the cam member by its piston to move the cam member against the stop toward which it has been moved previously only by the piston, to thereby move the cam member, the stop, the linkage, and the internal valve member to a position in which the fluid flow through the valve body is reversed. Following this, the aforesaid sequence is reversed by operation of the other hydraulic piston and the other stop on the linkage.

---

This invention relates to hydraulically operated mechanisms of the type which repeatedly reverses its operation, and more particularly to a control valve for such a mechanism which automatically reverses the hydraulic pressure which operates the mechanism to correspondingly reverse the operation of the mechanism itself, at predetermined intervals and in a novel manner having many desirable attributes.

In my previous United States Patent No. 2,920,753, I made known a reciprocating conveyor-type mechanism having particularly desirable application to the cleaning of gutters in barns and the analogous pits in poultry houses. It is to such a conveyor that the present invention applies with particular relevance. These conveyors are preferably hydraulically operated in the manner disclosed in my previous Patent No. 2,812,055, and require a reversing valve for causing automatic reciprocation of the conveyor apparatus by reciprocating the hydraulic cylinder and its associated equipment which is used to operate the conveyor. Such a control valve must be automatic, inasmuch as any manually-actuated valve is repugnant to the spirit of automation underlying the entire apparatus.

The reversing valve described in the said Patent No. 2,812,055 has a typical spool type of internal valve member which is moved to control the flow of hydraulic fluid through the valve. This movement is effected by a hydraulic feedback system in which the fluid pressure present in the inlet and outlet ports of the valve is applied to the ends of the spool, such that when a predetermined pressure is built up in one set of ports, the spool is automatically moved to relieve this pressure by directing the hydraulic fluid through other ports. When a predetermined pressure builds up in the latter ports, this pressure acts against the opposite end of the valve spool to move the spool back to its original position and again reverse the flow of hydraulic fluid.

Control valves of this general nature operate very satisfactorily under ideal conditions, and they will perform at surprisingly high frequencies of reversal. However, they require that the hydraulic fluid be kept absolutely clean and free of all contaminants, since they are very refined devices which utilize a number of ball-check valves which stick or jam very readily when they encounter even tiny particles of foreign matter. Consequently, these valves are unsuited to the rugged environment of the pit and gutter cleaning apparatus. Under these operating conditions, the presence of contaminants of all types in the system is practically inevitable in time. Often the pump used to power the hydraulic system is an integral part of a farm tractor. In such a case, the apparatus normally uses engine oil as a hydraulic fluid, and this oil is inter-circulated with that in the crankcase of the tractor engine. Consequently, there are many sources from which foreign matter may enter the oil, and it generally becomes contaminated before very long. When this occurs, regardless of the source of the contamination, the previous automatic reversing control soon becomes fouled and sticks or otherwise malfunctions.

What is needed is a reversing control valve which is unaffected by the presence of contamination in the hydraulic fluid which it directs and controls, and which also is completely automatic in operation. It is an important object of the present invention to provide such a control valve. Further, the control valve of the present invention is positive and certain in its operation and provides an extremely long and useful life in the typical rough farm environment. The controlling mechanisms of the present invention are exterior of the valve body itself, and are relatively simple in construction so as to afford excellent manufacturing economy. Also, these mechanisms are subject to very little wear or breakage, and individual parts are extremely easy to disassemble and replace in the event that this should become necessary.

The foregoing objects and advantages of the invention, together with other desirable aspects and features thereof, will become increasingly apparent to those skilled in the art to which the invention pertains upon consideration of the following specification and the appended claims, particularly when taken in conjunction with the accompanying illustrative drawings setting forth a preferred embodiment of the invention.

In the drawings:

FIG. 1 is a front perspective view of a valve equipped with the automatic reversing control of this invention;

FIG. 2 is a rear elevation of the apparatus of FIG. 1;

FIG. 3 is an enlarged frontal perspective view showing details of the cam block used in the invention;

FIG. 4 is an enlarged rear perspective view of the device of FIG. 3, showing further details thereof;

FIG. 5 is a broken rear elevation of the device of FIG. 2, showing a second operating position of the same; and FIG. 6 is a broken rear elevation of the mechanism of FIGS. 2 and 5, showing a third operating position of the same.

Briefly stated, the present invention provides an automatic reversing control for use in conjunction with a hydraulic valve of the type in which an internal valve member is moved from without the valve body to direct flow of pressurized hydraulic fluid through various selected outlet ports in the valve body in a desired manner. The present automatic reversing control senses the hydraulic pressure from two different outlet ports or groups thereof, and applies this pressure to a movable cam block which moves in one of two directions, depending upon which ports are carrying the pressurized fluid. The cam block has external cam surfaces formed upon it, and cam follower means ride these surfaces as the cam moves. After the cam has moved a predetermined distance in response to the pressure of the hydraulic fluid, it engages a stop mechanically connected to the internal valve means. At this point, the cam follower means acts against the cam block to cause it to continue to move in the same direction as before, carrying the stop with it. This moves the internal valve means and changes the flow of pressurized fluid through the valve body by directing it through different ports, thereby relieving the previous pressure applied to the cam block and applying a different pressure thereto. The new pressure causes the cam block to move in the opposite direction, and after a predetermined movement, it contacts a second stop means. At this point, the cam follower action is repeated to effect movement of the internal valve means back to its original position. This causes the hydraulic fluid to again be directed through the original ports, and a steady reversing operation is the result.

Referring now in more detail to the drawings, in FIG. 1 the basic valve mechanism is depicted at 10. This includes a valve body 12, having an inlet port 14 into which hydraulic fluid from a conventional pump mechanism (not shown) is fed, and a pump return port 16, through which the fluid flows from the valve 10 back to the hydraulic pump. The valve body 12 further includes a desired number of operational ports such as are shown at 18 and 20, through which hydraulic fluid may flow to operate external hydraulic cylinders and other machinery; specifically, the pit and gutter-cleaning reciprocating conveying machinery of United States Patent No. 2,920,753, noted previously.

The pressurized fluid for operating the external equipment may either flow out of or into either of the ports 18 and 20, depending upon the manner in which it is directed by the valve mechanism 10. This direction is accomplished by means of an internal valve member of a conventional nature such as is typically referred to as a spool. As is well-known, the spool is an accurately machined cylindrical member having precisely positioned lands and grooves. The spool generally protrudes from the valve body, and in the present instance, it is identified by numeral 22. By moving the spool longitudinally within the valve body, its lands and grooves are moved relative to internal passageways inside the valve body to direct the flow of pressurized fluid from the inlet port 14 out of one of the operational ports 18 or 20, and also to direct fluid returning from the external apparatus to the other operational port into the pump return system, so that it will be returned to the pump through port 16. When the spool is moved in the opposite direction, the opposite results occur; that is, pressurized fluid is directed to the second operational port and returned through the first. This naturally reverses the external machinery.

FIGS. 1 and 2 together illustrate the apparatus of the invention which automatically controls the operation of the valve mechanism 10 so that it regularly and repeatedly reverses itself and the external machinery which it controls. It will be seen that a strap-like linkage 24 is rigidly connected to the protruding portion 22 of the valve spool so as to form an extension of the spool. A cam block 26 is slidably connected to the linkage 24, in a manner to be explained subsequently, such that the cam block may be smoothly and readily slid longitudinally of the linkage. A pair of spaced stop means 28 and 30 are secured to the linkage 24 to limit the allowable travel of the cam block 26. As the figures show, the stops 28 and 30 are preferably a generally L-shaped angle section which are rigidly secured to the slide 24 by bolts or other conventional means.

A pair of cam follower elements 32 and 34 are pivotally connected to the valve body 12 at points 36 and 38, respectively, near the upper extremity of the valve body. It is to be noted that the upper portion of each of the cam follower elements 32 and 34 carries a flat extension 40 and 42, respectively. A compression spring assembly 44 is positioned between the extensions 40 and 42 and serves to exert a constant resilient outward biasing force against each. This force serves to bias the lower extremities of each of the cam follower elements inwards toward each other and toward the cam block 26. As is best shown in FIG. 1, each of the lower ends of the two cam follower elements 32 and 34 carries a roller follower element 46 and 48, respectively. These follower elements engage cam surfaces on the exterior of the cam block 26.

The nature of the cam block 26 is shown in detail in FIGS. 3 and 4. The cam block is generally hexagonal in shape and has two opposite pairs of side surfaces designated 50 and 51 and 52 and 53, respectively. Each two surfaces in such a pair meet at an angle of approximately 90°. It will be noted that a generally channel-shaped recess 54 is formed on one side of the cam block (FIG. 3). As this figure shows, the slide linkage 24 described previously is smoothly fitted into channel 54, and the cam block is slidably retained in position upon the slide 24 by means of a bridging plate 56 which is fastened to the cam block by a pair of bolts 58 or the like, so as to span the channel-shaped recess.

As FIGS. 3 and 4 also show, the remaining two side surfaces of the hexagonal cam block, designated 60 and 62, are positioned approximately perpendicular to the longitudinal axis of the slide linkage 24. As has previously been noted, a pair of spaced stop means 28 and 30 are secured to the linkage on either side of the cam block 26. The lowermost stop 30 has its outwardly-projecting portion positioned perpendicular to the slide linkage, and directly aligned with end surface 60 of the cam block. The same is true of the upper stop means 28, with regard to end surface 62 of the cam. Consequently, should the cam be slid a predetermined distance in either direction upon the slide linkage, its travel will be limited by reason of end surfaces 60 and 62 coming into contact with the stop means.

It should especially be noted that a pair of cylindrical chambers 64 and 66 (FIG. 4) are formed into the cam block normal to end surfaces 60 and 62, respectively. A cylindrical piston 68 or 70 closely fits within each of the chambers 64 and 66, respectively. The chambers themselves extend inwardly into the cam block and communicate with a corresponding opening 72 or 74, respectively, formed in the rear side of the cam block, opposite from the recessed channel 54. Each of the openings 72 and 74 are connected by appropriate fluid couplings (see FIG. 2) to one of a pair of hydraulic pressure-sensing lines 76 and 78, respectively, as shown in FIGS. 1 and 2. These lines couple whatever hydraulic pressure is present at the operational ports 18 and 20 to the corresponding chambers 64 and 66, respectively, in the cam block. Consequently, the same pressure is applied to the pistons 68 and 70, respectively. This naturally forces the pistons outwardly of the cam and against the particular stop means 30 or 28, respectively, aligned with that piston.

Having now completely described the structure of a preferred embodiment of the invention, its assembly will be quite apparent. The manner in which this embodiment operates is as follows. With the valve mechanism 10 connected to a desired hydraulic pump at its inlet port 14 and its return port 16, and with a desired hydraulic load mechanism such as a typical hydraulic cylinder connected at its opposite ends to the operational ports 18 and 20, the cam and cam follower assembly will initially be in the position shown in FIG. 2.

In this position, the cam is at one of the extremes of its travel, with lower piston 68 fully extended from the cam block, upper piston 70 fully retracted into the cam block, and the slide linkage 24 and protruding portion 22 of the inner valve means in their uppermost position. Under these circumstances, hydraulic pressure from the pump will be directed out of one of the operational ports (in this instance port 20), while the other operational port (here port 18) communicates with the pump return port 16. The pressure present at operational port 20 will be determined by the capacity of the pump and the loading effect of the cylinder or other mechanism being actuated. Thus, initially the pressure is liable to be relatively small, although adequate to set the external cylinder in motion. This pressure is applied to piston 70 through hydraulic line 78. This causes the piston to exert a force against stop means 28 which tends to move the cam block 26 downward. However, it will be noted (FIG. 2) that the roller elements 46 and 48 of cam follower means 32 and 34, respectively, are engaged with the two lowermost cam side surfaces 50 and 52, respectively. The compressive force exerted by spring means 44 at the top of the cam follower means forces the bottom of the two cam follower elements toward each other. This results in an upwardly-directed force which opposes the downwardly-directed force exerted by piston 70 as a result of the hydraulic pressure.

As the hydraulic pressure applied to the external cylinder increases under loading effects in the normal manner, the force exerted by piston 70 gradually overcomes that of the cam follower means, and consequently, the cam 26 gradually moves downward. This spreads the bottom ends of the cam follower elements 32 and 34, and their associated roller elements 46 and 48 in effect roll upwardly on cam surfaces 50 and 52. Eventually, the roller elements will encounter the junction of cam surfaces 50 and 52 with surfaces 51 and 53 respectively (not FIG. 5). When the cam moves past this point (FIG. 6), the force vector resulting from the spring means 44, which the cam follower means 32 and 34 exert upon the cam block 26, reverses, since in effect the cam block has now moved "over center." Thus, the force exerted by the cam follower means now augments the force exerted by piston 70 against stop means 28, and causes the cam block 26 to move downwardly against stop means 30 at the bottom of the slide linkage 24.

At this point, the hydraulic pressure behind piston 70 has moved the cam block as far as it can, since although the piston continues to exert a force against stop means 28, this force is in effect balanced by the opposite and equal force of the lower cam surface 60 pressing against the lower stop means 30. The two cam follower elements 32 and 34 continue to exert a downwardly-directed force against the cam, however, and this causes the cam to continue its downward movement. During this movement, the roller elements 46 and 48 of the cam follower mechanism in effect ride up exterior cam surfaces 51 and 53 (FIG. 6), and move toward each other (compare FIGS. 5 and 6). As the cam block is moved downward by the cam followers, it carries with it the lower stop 30, against which the cam is pressed. This in turn moves the slide linkage 24 to which the stop 30 is attached, and also the spool inside the valve, to whose protruding portion 22 the slide linkage 24 is firmly attached.

The movement thus imparted to the inner valve member or spool causes a realignment of the internal passageways within the valve, which reverses its operation. That is, hydraulic pressure from the pump becomes directed through operational port 18, rather than operational port 20, as was previously the case. In the example under consideration, this force is applied to the opposite end of the external hydraulic cylinder, and the end thereof which was first pressurized becomes coupled to the pump return 16 of the valve. Consequently, the external cylinder is driven in the reverse direction.

As the external hydraulic cylinder is driven in the reverse mode of operation, the automatic reversing control of the present invention operates in a manner opposite from that just described. That is, the operating pressure from port 18 is applied through hydraulic line 76 to piston 68. As the operating pressure acts against the external hydraulic cylinder, its pressure is raised, and this causes piston 68 to be forced downwardly against the lowermost stop 30. It will be remembered that cam follower elements 32 and 34 are still in the position shown in FIG. 6, in which their roller elements 46 and 48 are biased inwardly against the upper cam surfaces 51 and 53. Accordingly, the cam follower mechanism exerts a downwardly-directed force which opposes the upward force produced by piston 68.

As the operating pressure applied to the external cylinder builds up, piston 68 exerts an increasing amount of force against the stop 30. This force gradually overcomes the force exerted by the cam follower mechanism against the cam, and the cam is gradually moved upward relative to the stop 30 and the cam followers. This spreads the two cam follower elements 32 and 34 apart, as their respective roller elements 46 and 48 travel along cam surfaces 51 and 53, respectively. As in the previous operation, when the cam block has moved upward to the point where it passes through the position shown in FIG. 5, the roller elements 46 and 48 of the cam followers move "over center" once again by passing over the squared lobe portion of the two pairs of external cam surfaces.

When this occurs and the roller elements of the cam follower encounter cam surfaces 50 and 52, the force vector resulting from the cam follower mechanism suddenly reverses and urges the cam block upward to augment the upwardly-directed force due to piston 68 acting against stop 30. Thus, the cam block is moved firmly against the upper stop 28 (FIG. 2), at which point piston 70 is fully retracted into the cam block, upper cam surface 62 contacts the stop 28, and piston 68 is extended the fullest extent possible. The force exerted by the cam follower mechanism now acts to move the cam and the cam stop 28 upward, thereby moving the attached slide linkage 24 and protruding portion 22 of the valve spool along with it. This moves the spool internally within the valve body the necessary amount to once again reverse the direction of hydraulic fluid through the valve, placing the valve in the condition under which it operated originally, and simultaneously reversing the external hydraulic cylinder or like mechanism.

It will be appreciated by those skilled in the art to which the invention applies that, in accordance with the foregoing description of the structure of the invention and the manner in which the various components cooperate, the present invention provides an automatic reversing control for hydraulic valves having many desirable attributes and features not previously available, including the strength and dependability of its operation which is essentially unaffected by rough operating conditions and the presence of foreign matter within the hydraulic fluid. Although the novel device has been described as having particularly desirable application to the reciprocating conveyor mechanisms used in the automatic cleaning of pits and gutters in poultry houses and barns, it obviously has many other such applications and the foregoing environment is mainly of an illustrative nature. Also, certain variations and modifications in particular details of the structure shown herein will likely occur to those skilled in the art after gaining a thorough appreciation of the spirit of the invention embodied in the illustrated mechanism. All such modifications and alterations as incorporate the spirit of the invention and depend upon it for inspiration are to be considered a part of the invention and encompassed within the appended claims, unless these claims by their language expressly state otherwise.

I claim:

1. An automatically reversing hydraulic control valve assembly comprising in combination: a valve body having pump fluid inlet and return ports and operating fluid inlet and outlet ports, and including internal valve means movable relative to said body for changing the flow of operating fluid by directing the same out of and into predetermined ones of said operating ports; cam means external of said valve body; a linkage means slidably connecting said cam means to said internal valve means for sliding movement with respect thereto, said linkage having a pair of spaced stops; said cam means movable relative to said valve means and linkage means between said stops and intermediate predetermined actuating cam positions; said cam means arranged to exert a force against said stops to move the said linkage means and valve means at its said actuating positions to reverse the direction of flow of said operating fluid in the above-said manner; cam follower means biased against said cam and arranged to provide the said force of said cam against either of said stops dependent upon the position of said cam with respect to said stops; fluid operated means exerting a force between said stops and cam for moving said cam against the bias of said cam follower means into said positions with respect to said stops in response to the direction and pressure of said operating fluid, whereby predetermined operating conditions cause said cam means to move to one of its said actuating positions wherein said control valve assembly reverses its operating conditions.

2. An automatically reversing hydraulic control valve assembly comprising in combination: a valve body having pump fluid inlet and return ports and operating fluid inlet and outlet ports, and including internal valve means movable relative to said body for changing the flow of operating fluid by directing the same out of and into predetermined ones of said operating ports; a mechanical linkage connected to said valve means through said valve body; a cam block slidably attached to said linkage externally of said valve body; a pair of spaced cam stops fixedly secured to said linkage for limiting the movement of the said cam relative to the linkage; and cam follower means for slidably moving said cam block upon said linkage toward and against either of said stops to exert a force against said stops; said cam follower means biased against said cam block and arranged to provide the said force of said cam block against either of said stops dependent upon the position of said cam block with respect to said stops; fluid operated means exerting a force between said stops and cam block for moving said cam block against the bias of said cam follower means into said positions with respect to said stops in response to a predetermined flow of said operating fluid to cause said control valve assembly to reverse its said operating flow conditions.

3. An automatically reversing hydraulic control valve assembly comprising in combination: a valve body having pump fluid inlet and return ports and operating fluid inlet and outlet ports, and including internal valve means movable relative to said body for changing the flow of operating fluid by directing the same out of and into predetermined ones of said operating ports; a mechanical linkage connected to said valve means through said valve body; a cam block slidably attached to said linkage externally of said valve body; a pair of spaced cam stops fixedly secured to said linkage for limiting the movement of the said cam relative to the linkage; said cam block having hydraulic piston means exerting a force between said stops and cam block in response to a predetermined flow of said operating fluid to slidably move the cam block toward and against either of said stops by acting against the other stop; and resiliently biased cam follower means biased against said cam block and operable when said cam block contacts either of said stops to exert a force to move the cam, the stop, the linkage, and the valve means, and thereby cause said control valve assembly to reverse its said operating flow conditions.

4. An automatically reversing hydraulic control valve assembly comprising in combination: a valve body having pump fluid inlet and return ports and operating fluid inlet and outlet ports, and including internal valve means movable relative to said body for changing the flow of operating fluid by directing the same out of and into predetermined ones of said operating ports; a mechanical linkage connected to said valve means through said valve body; a cam block slidably attached to said linkage externally of said valve body; a pair of spaced cam stops fixedly secured to said linkage for limiting the movement of the said cam relative to the linkage; said cam block having hydraulic piston means exerting a force between said stops and cam block in response to a predetermined flow of said operating fluid to slidably move the cam block toward and against either of said stops by acting against the other stop; said cam block further having exterior cam surface portions; and resiliently biased cam follower means biased against said cam surface portions for independently forcing said cam further against the said stop to move the cam, the stop, the linkage, and the valve means, and thereby cause said control valve assembly to reverse its said operating flow conditions.

5. An automatically reversing hydraulic control valve assembly comprising in combination: a valve body having pump fluid inlet and return ports and operating fluid inlet and outlet ports, and including internal valve means movable relative to said body for changing the flow of operating fluid by directing the same out of and into predetermined ones of said operating ports; a mechanical linkage connected to said valve means through said valve body; a cam block slidably attached to said linkage externally of said valve body; a pair of spaced cam stops fixedly secured to said linkage for limiting the movement of the said cam relative to the linkage; said cam block having hydraulic piston means exerting a force between said stops and cam block in response to a predetermined flow of said operating fluid to slidably move the cam block toward and against either of said stops by acting against the other stop; said cam block further having a pair of inclined exterior cam surfaces arranged to form a lobe; and cam follower means resiliently biased against said lobe to exert a force against the particular inclined surface aligned therewith tending to move said cam in the direction of one of said cam stops; said hydraulic piston means initially moving said cam against the opposition of said cam follower bias force until the other of said cam surfaces has moved into alignment with said cam follower means; and said hydraulic piston means and said cam follower bias force then acting together to move the cam, the said stop means, said linkage, and the valve means; whereby said control valve assembly reverses its said operating flow conditions.

6. An automatically reversing hydraulic control valve assembly comprising in combination: a valve body having pump fluid inlet and return ports and operating fluid inlet and outlet ports, and including internal valve means movable relative to said body for and flow of operating fluid by directing the same out of and into predetermined ones of said operating ports; a mechanical linkage connected to said valve means through said valve body; a cam block slidably attached to said linkage externally of said valve body; a pair of spaced cam stops fixedly secured to said linkage for limiting the movement of the said cam relative to the linkage; said cam block having a pair of pistons extendable therefrom toward said cam stops; hydraulic lines connecting operating fluid to said pistons; each of said pistons arranged to be extended outwardly from said cam block to contact one of said stops in response to a predetermined direction and pressure of said operating fluid; said cam block further having oppositely-disposed pairs of like inclined exterior cam surfaces forming symmetrical lobes; and a pair of cam follower means; each of said follower means being pivotally connected to a rigid support and resiliently biased against one of said lobes to exert balanced forces against the particular inclined surfaces aligned therewith tending to move said cam in the direction of one of said cam stops; said hydraulic piston means initially moving said cam against the opposition of said cam follower bias forces until the other inclined surface in each of said pairs of same has moved into alignment with its corresponding cam follower means; and said hydraulic piston means and said balanced cam follower forces then acting together to move the cam, the said stop means, the said linkage, and the valve means; whereby said control valve assembly reverses its said operating flow conditions.

References Cited

UNITED STATES PATENTS

| | | | |
|---|---|---|---|
| 1,821,986 | 9/1931 | Plint | 137—104 |
| 2,814,310 | 11/1957 | Lower | 251—75 X |
| 3,167,083 | 1/1965 | Nickell | 137—104 |

ALAN COHAN, *Primary Examiner.*